United States Patent [19]
Spector

[11] Patent Number: 6,052,499
[45] Date of Patent: Apr. 18, 2000

[54] OPTICAL DEMULTIPLEXER FILTER SYSTEM TO ELIMINATE CROSS-TALK SIDE-LOBES

[75] Inventor: Magaly Spector, New Providence, N.J.

[73] Assignee: Lucent Technologies Inc., Murray Hill, N.J.

[21] Appl. No.: 09/037,091

[22] Filed: Mar. 9, 1998

[51] Int. Cl.[7] .................................................. G02B 6/293
[52] U.S. Cl. ............................................. 385/24; 359/127
[58] Field of Search ................................. 385/15, 24, 27, 385/43, 39, 28, 29; 359/124, 127, 161

[56] References Cited

U.S. PATENT DOCUMENTS

| | | | |
|---|---|---|---|
| 5,035,481 | 7/1991 | Mollenauer | 385/24 X |
| 5,136,671 | 8/1992 | Dragone | 385/39 X |
| 5,668,900 | 9/1997 | Little et al. | 385/43 X |
| 5,710,849 | 1/1998 | Little et al. | 385/27 X |
| 5,777,793 | 7/1998 | Little et al. | 359/127 X |

*Primary Examiner*—John D. Lee

[57] ABSTRACT

Optical amplifiers are typically disposed along the transmission path of an optical system. If a large number of optical amplifiers, e.g., eight, are so disposed, then it is likely that an appreciable level of so-called power divergence will occur among the optical signals forming a composite optical signal that traverses the path. Disadvantageously, when the composite signal is received at a destination and demultiplexed, a number of the demultiplexed optical signals will contain components of the other demultiplexed optical signals as a result of such power divergence. This problem is readily handled using a facility which greatly suppresses such components in a demultiplexed optical signal.

8 Claims, 6 Drawing Sheets

OPTICAL DEMULTIPLEXER FILTER SYSTEM TO ELIMINATE CROSS-TALK SIDE-LOBES

FIELD OF THE INVENTION

The invention relates to optical transmission systems, and more particularly relates to so-called power divergence that occurs within an optical transmission system.

BACKGROUND OF THE INVENTION

The gain of an optical amplifier is typically not flat over the response of the amplifier—which means that different levels of gain are applied to optical signals of different wavelengths. FIG. 1 illustrates the response of a typical erbium doped optical amplifier. Referring to the section designated R, a greater level of amplification occurs for those signals having wavelengths from 1553 nm to 1559 nm than for those signals in the R region and having wavelengths from 1548 nm to 1552 nm. Thus, some optical signals are amplified greater than other optical signals passing through the optical amplifier. This difference in amplification is referred to herein as power divergence, and needs to be dealt with.

SUMMARY OF THE INVENTION

I have recognized that the severity of the power divergence problem is directly proportional to the number of power amplifiers disposed in an optical transmission path as well as the number of optical channels that are being transported over the path. I have also recognized that when the channels are demultiplexed at an intended destination some of the demultiplexed signals contain appreciable levels of signals from the other channels, i.e., significant levels of so-called cross-talk, as a result of such power divergence.

I deal with this problem by inserting, in accordance with an aspect of the invention, loss in the path of each of the significantly affected channels to greatly decrease the level of cross-talk in each of those channels. In accordance with another aspect of the invention, all of the significantly affected demultiplexed channels are passed through a single loss device, which similarly decreases the level of cross-talk in each of the significantly affected channels.

These and other aspects of the invention are set forth in the following detailed description, accompanying drawings and claims.

DETAILED DESCRIPTION

Figure 1:
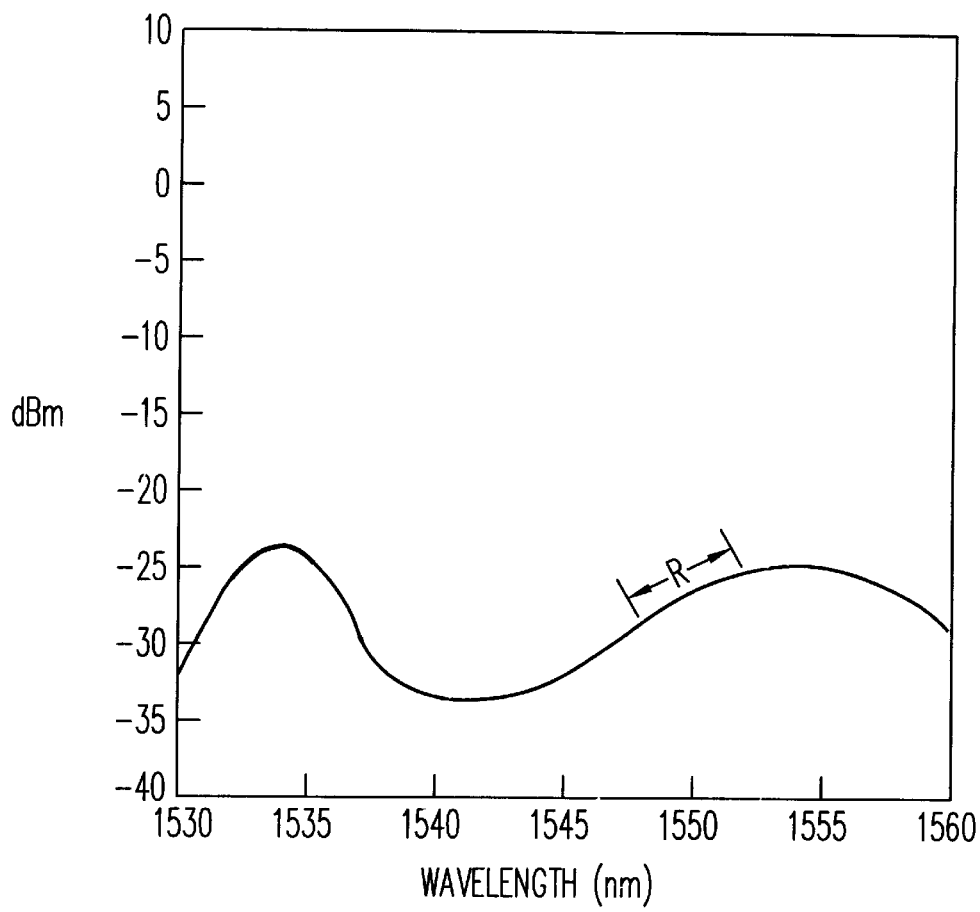
FIG. 1 illustrates a typical response of an erbium doped optical amplifier and is useful for understanding the underlying problem.
Figure 2:
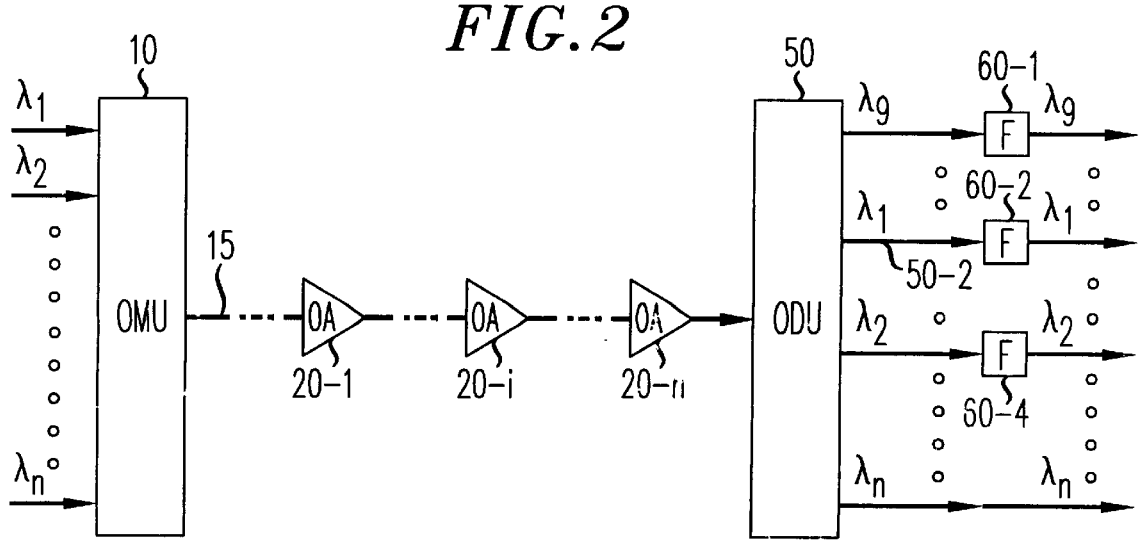
FIG. 2 shows a broad block diagram of an optical transmission system arranged in accordance with the principles of the invention.

In an illustrative embodiment of the invention, FIG. 2, a number, e.g., sixteen, of different optical signals having respective wavelengths of $\lambda_1, \lambda_2, \lambda_3$ through $\lambda_n$ are supplied to a conventional optical multiplexer (OMU) 10 in an optical node. Multiplexer 10, which may be, for example, a so-called Dragone router, multiplexes the optical signals $\lambda_1$ through $\lambda_n$ in a conventional manner to form a composite optical signal, and then transmits the composite signal over transmission path 15. For the following discussion, assume that the length of transmission path 15 is substantial, requiring amplification of the optical signal at different points along the path. To meet that requirement, assume that the path contains a number of spaced-apart optical amplifiers 20-1 through 20-n, e.g., eight erbium doped amplifiers.

Figure 3:
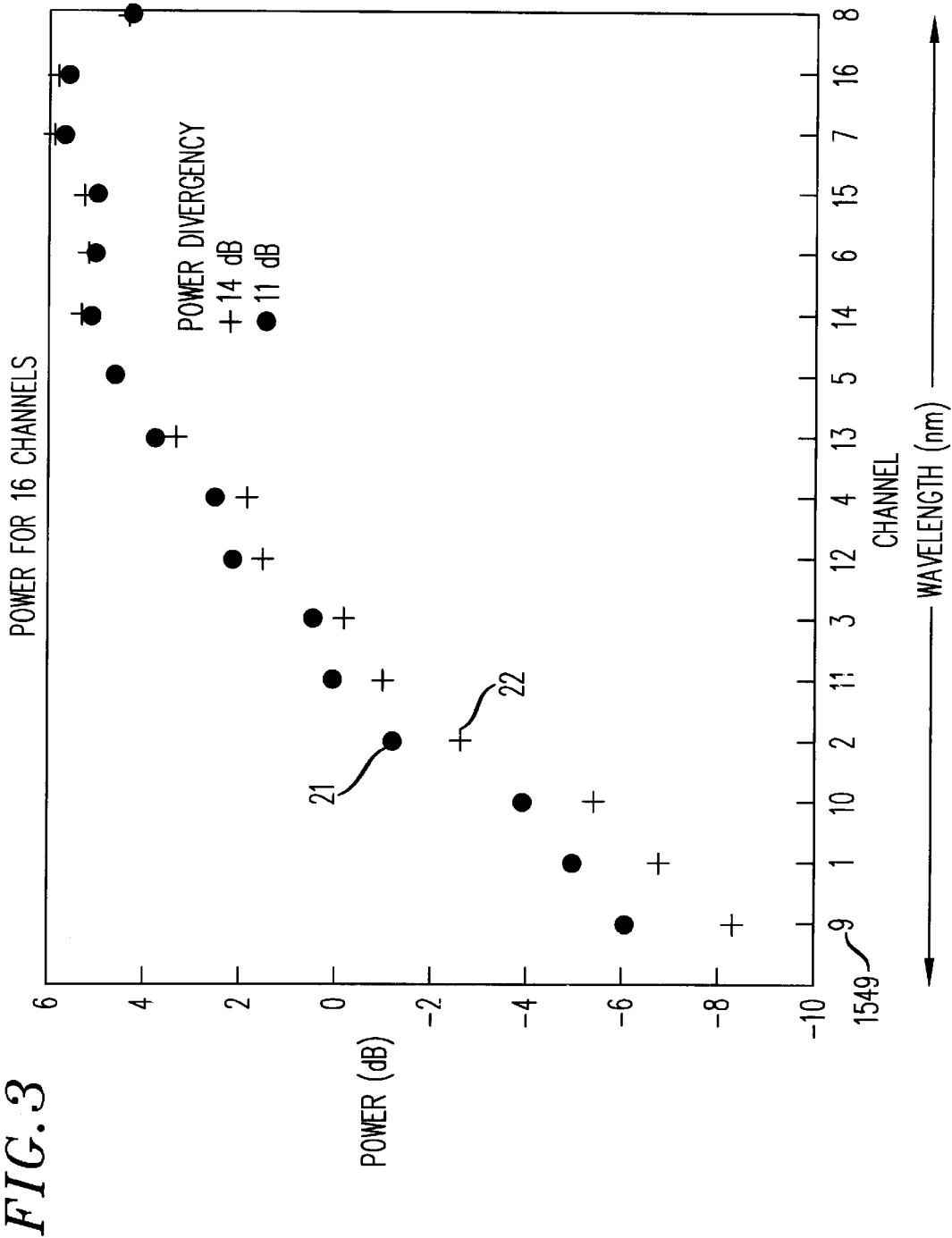
FIG. 3 illustrates different levels of power divergence that may occur among optical channels.
Figure 4:
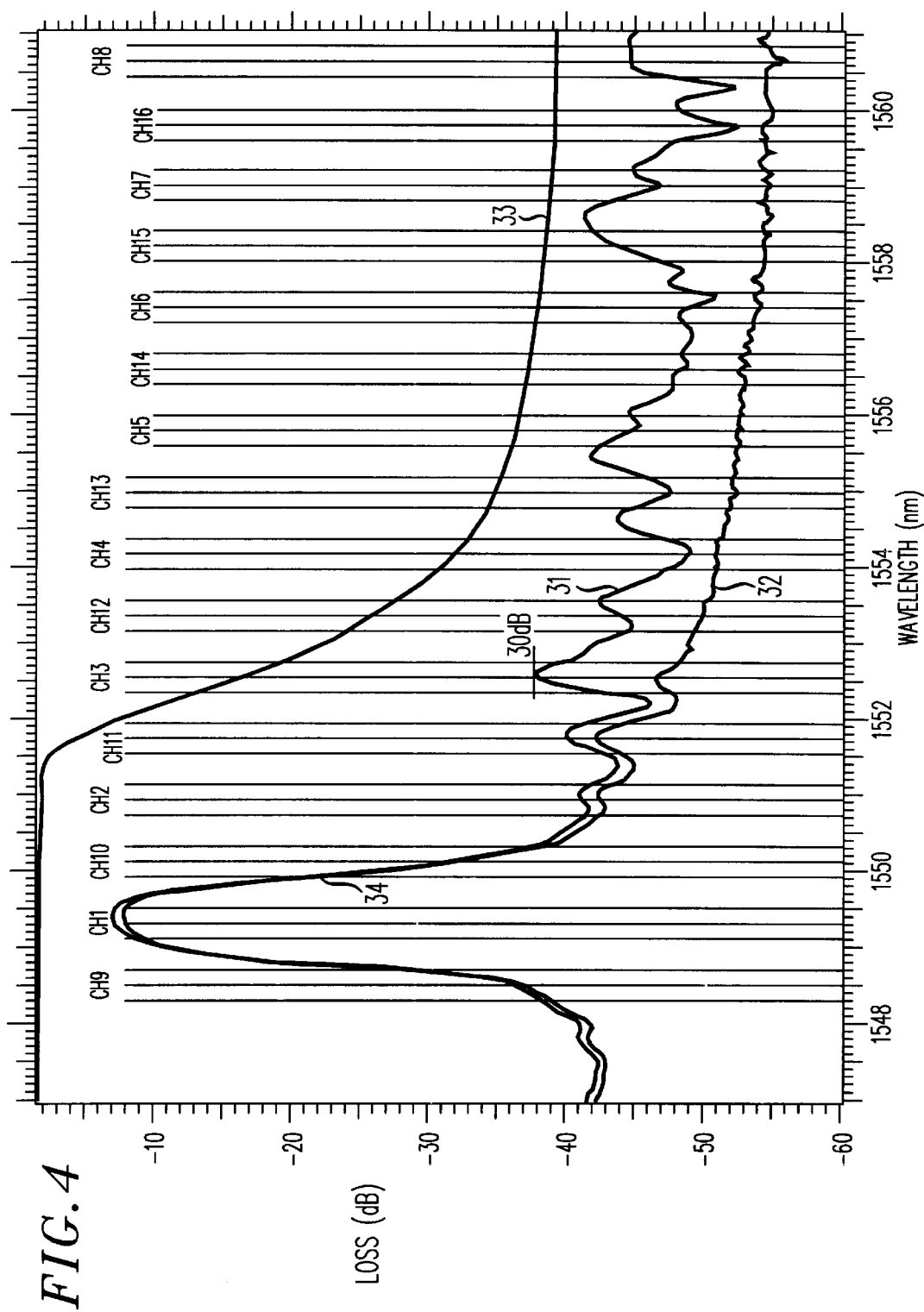
FIG. 4 illustrates a number of different curves that are useful in understanding and appreciating the principles of the invention.

As discussed above, the amplification of certain optical signals by each of the amplifiers 20-1 through 20-n will be greater than the amplification of other ones of the optical signals, causing a power divergence to be created between the signals. I have recognized that the level of such power divergence is a function of the number of active optical channels (bandwidths) and number of cascaded amplifiers that will amplify the channels. Currently, the greatest number of optical channels that is being used in an optical system is sixteen. However, that number may soon increase to 75 or more channels, which will exacerbate the power divergence problem. The power divergence problem is illustrated in FIG. 3 which shows power divergence curves 21 and 22 respectively characterizing a power divergence of 11 dB and 14 dB, that may occur in systems having 16 active channels and approximately eight erbium doped optical amplifiers in the transmission path. Curve 22 shows that a power divergence of approximately 14 dB occurs between channels 7 and 9. Curve 21, on the other hand, shows that a power divergence of 11 dB occurs between those two channels. (Note that in an optical transmission path, power divergencies of 11 dB and 14 dB may occur at the output of the seventh and eighth optical amplifiers.) A large power divergence also occurs between channel 9 and other channels, e.g., channels 5, 14, 15, 16 and 8. This is true for still other channels, namely, channels 1, 2 and 10, as is shown by FIG. 3—which means that it is likely that when channel 9, 1, 2 and 10 are demultiplexed in a conventional way at a destination node, then those demultiplexed signals will contain cross-talk from the channels having stronger signals. This problem is illustrated in FIG. 4 showing the signal spectrum for demultiplexed channel 1 (wavelength of 1549.315 nm) at the output of ODU 50 (e.g., a so-called Dragone router) in an optical node. It is seen from the spectrum shown in FIG. 4 that demultiplexed channel 1 also contains, as a result of the power divergence between channel 1 and the other aforementioned channels, significant levels of "cross-talk" or signal components from other channels (as shown by curve section 31). Curve 32 shows a more ideal case in which the such cross-talk is suppressed, in accordance with an aspect of the invention, as will be discussed below.

Figure 5:
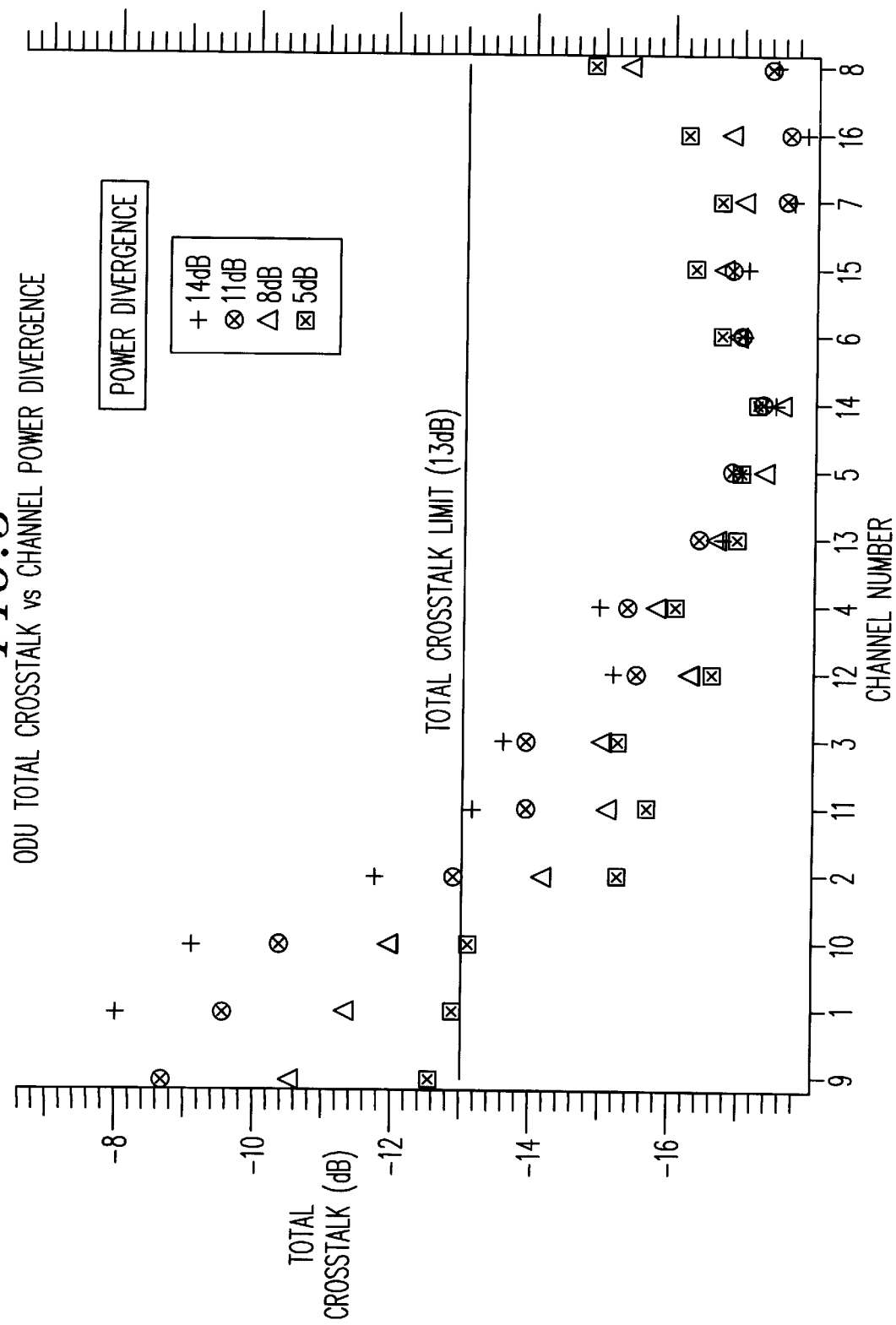
FIG. 5 illustrates the levels of cross-talk that occurs among the optical channels for different levels of power divergence.

From a system design perspective, total cross-talk should be limited to 13 dB, as shown in FIG. 5 illustrating four different curves for different levels of power divergence for an optical system having a number of, e.g., eight, cascaded optical amplifiers in the transmission path as shown in FIG. 2. Note that a power divergence of 5 dB, 8 dB, 11 dB and 14 dB typically occurs at the output of the fourth or fifth amplifier, seventh amplifier and eighth amplifier, respectively. It is seen from FIG. 5 that for a power divergence of, e.g., 14 dB (identified by the + points), channels 9, 1, 10 and 2 do not meet a predetermined cross-talk limit, e.g., a limit of 13 dB. (Note, for example, that for most other cases, channels 9, 1 and 10 still do not meet the 13 dB cross-talk limit. See, for example the curve for a power divergence of 8 dB (designated by the Δ points)).

I have recognized that for the optical system of FIG. 2 and for optical systems having a large number of optical amplifiers in the transmission path or span, the level of cross-talk contained in a demultiplexed signal as a result of the power divergence problem may be dealt with by suppressing the cross-talk. This may be done, in accordance with an aspect of invention, by adding additional loss to a demultiplexed signal in a way that suppresses the cross-talk only. More specifically, by inserting a "loss device" in the path of a demultiplexed signal such that the device suppresses only the cross-talk that may be present in the demultiplexed signal. In accord with another aspect of the invention, I achieve this result by placing a thin-film filter at the port of the demultiplexer which couples to an output a demultiplexed signal containing a level of cross-talk which does not meet the predetermined limit, e.g., 13 dB. The thin-film filter, which is tuned to the demultiplexed signal, allows the demultiplexed signal to easily pass through the filter, but suppresses other optical signals, especially the optical signals that are due to cross-talk, as is represented by curve 32, FIG. 4. (Each such thin-film may be obtained from Oplink Communications Inc. of Hoboken, N.J., USA as Part No. IBPF-5LT-16-1-1. Note that curve 33 characterizes the loss response of the thin-film filter, which greatly suppresses the signals in section 31 of response curve 34, as is illustrated by curve section 32. In accordance with a particular embodiment of the invention explained below, the thin-film filter is tuned to channels 9, 1, 10 and 2 and may be disposed such that the demultiplexed signals corresponding to those channels are coupled to respective input ports of the thin-film filter. The coupled optical signals then pass through the filter such that the filter suppresses only the cross-talk in each of those signals. (Note that the latter filter may also be obtained from Oplink Communications Inc. of Hoboken, N.J., USA as Part Number IBPF-5LT-16-1-1.) Thus, a single thin-film filter may be used to filter four optical signals instead of four individually tuned filters, which greatly reduces the cost of adding loss to the demultiplexed signals to suppress cross-talk.

Figure 6:
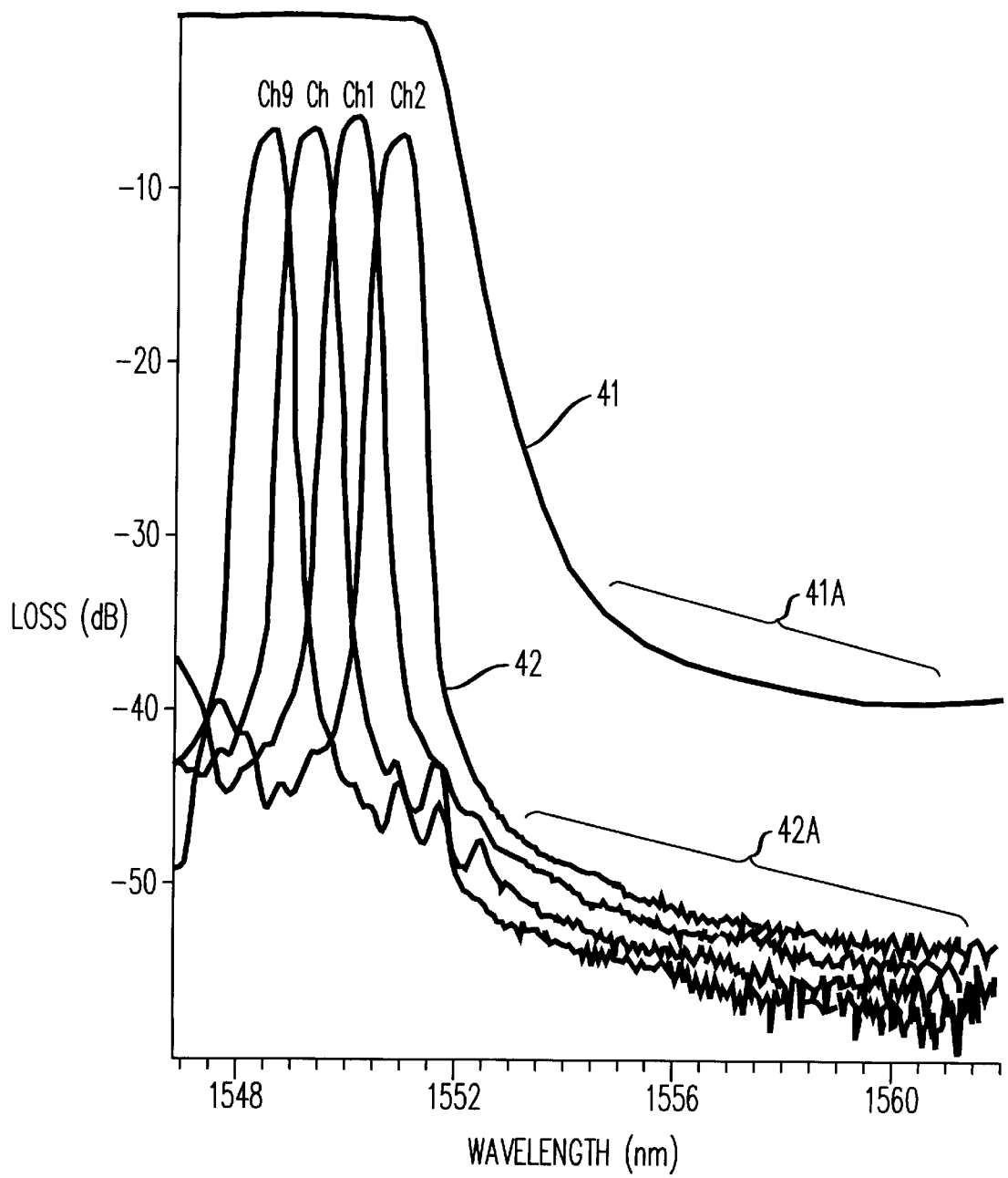
FIG. 6 illustrates the effect of the principles of the invention.

The effect of this aspect of the invention is shown in FIG. 6. Specifically, curve 41 is the loss response of the thin-film filter covering channels 9,1,10 and 2, as represented by curve 42. It is seen from the FIG. that the loss response represented by section 41A of the filter response greatly suppresses the cross-talk, designated as section 42A of curve 42.

Returning to FIG. 2, the composite signal is amplified by each of the optical amplifiers (OA) 20-1 through 20-n and the final amplified result is supplied to optical demultiplexing unit (ODU) 50, which also may be, e.g., a Dragone router. ODU 50 demultiplexes the composite signal into constituent signals of respective wavelengths $\lambda_1$ through $\lambda_n$, in which the first four signals, corresponding to channels 9, 1, 10 and 2, contain cross-talk signals the level of which do not meet the 13 dB requirement, as represented in the FIG. by the superscript *. To address that problem a thin-film filter (F) having the appropriate loss response, e.g., the response shown in FIG. 3 as curve 33, is inserted into the output path of a significantly affected signal. For example, a thin-film filter (F) 60-2 having the response shown in FIG. 4 is inserted in the output path 50-2 to suppress the cross-talk contained in channel 1, such that the response of the signal at the output of filter 60-2 is characterized by curve 32 of FIG. 4. Appropriate thin-film filters 60-1, 60-3 (not shown) and 60-4 are also inserted in the output paths of the other significantly affected signals, namely channels 9, 10 and 2.

It is noted that such an appropriate filter may be respectively inserted in the output paths of the other channels to suppress the cross-talk contained in those channels, if it is so desired.

Figure 7:
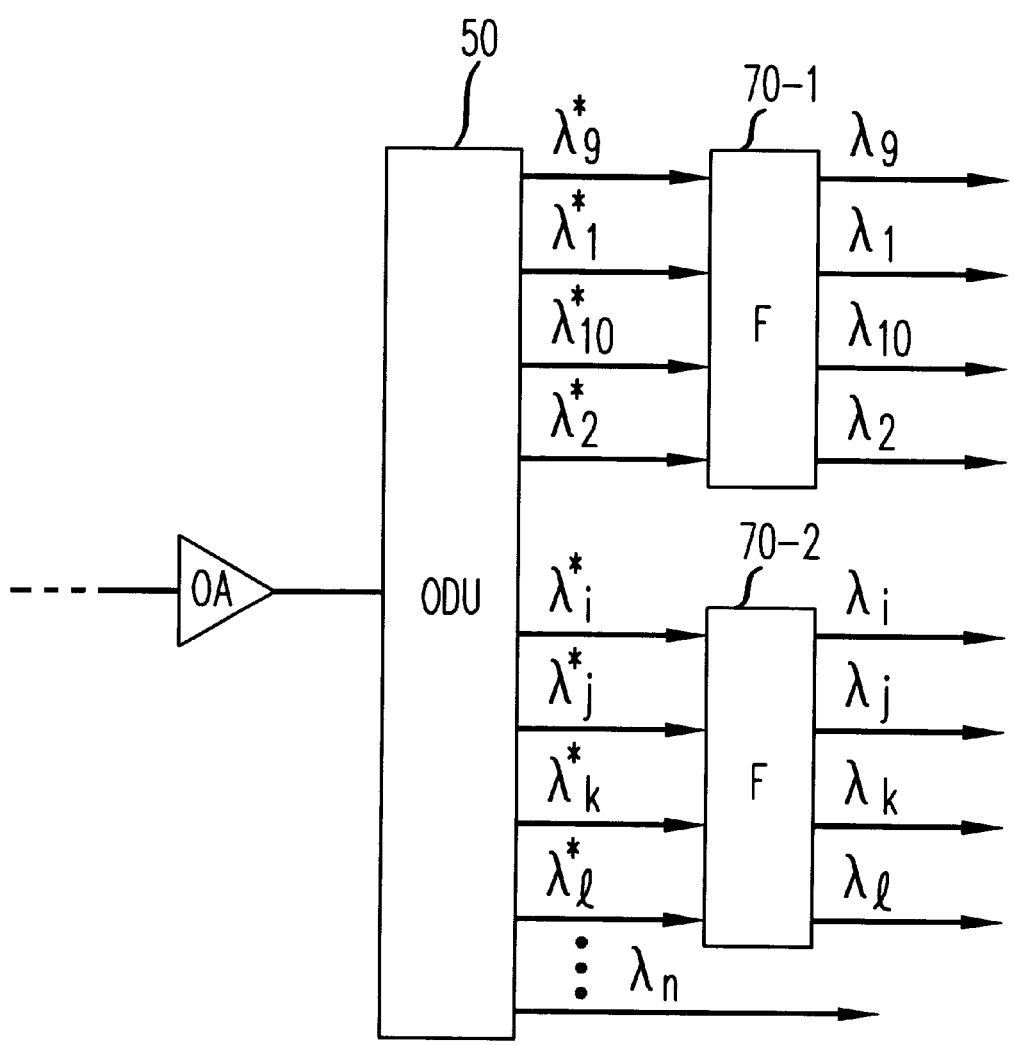
FIG. 7 illustrates a portion of FIG. 2 arranged in accordance with another embodiment of the invention.

FIG. 7 is a partial block diagram of FIG. 2 modified to show the embodiment of the invention in which one thin-film filter 70-1 is used to suppress the cross-talk in channels 9, 1, 10 and 2. FIG. 7 also shows that another thin-film filter, e.g., filter 70-2, may be used to suppress the cross-talk present in another group of channels, in which the response of filter 70-2 covers the response for that group of channels similar to the manner shown in FIG. 6.

The foregoing is merely illustrative of the principles of the invention. Those skilled in the art will be able to devise numerous arrangements, which, although not explicitly shown or described herein, nevertheless embody those principles that are within the spirit and scope of the invention.

I claim:

1. An optical transmission system having first and second optical nodes which communicate via an optical transmission path such that the first optical node transmits an optical composite signal formed from a plurality of optical signals of respective wavelengths to the second optical node, in which the optical transmission path contains a plurality of spaced-apart optical amplifiers, the optical transmission system further comprising demultiplexer means at the second optical node for demultiplexing the composite optical signal after it has been received by the second optical node into the plurality of optical signals having respective wavelengths and for then coupling the demultiplexed optical signals to respective output paths; and at least one transmission filter device inserted in the respective output path of at least one of the demultiplexed optical signals to suppress the level of at least one other one of the demultiplexed optical signals that may have been coupled to the respective output path as a result of optical-amplifier power divergence and to pass said one of the demultipilexed signals to an output terminal.

2. The optical transmission system of claim 1 wherein the at least one transmission filter device inserts loss in the respective output path such that the loss does not suppress the level of the one demultiplexed signal.

3. The optical transmission system of claim 1 wherein the at least one transmission filter device is an optical thin-film filter.

4. The optical transmission system of claim 1 wherein the wavelength of the one demultiplexed signal is between 1548 nm and 1552 nm.

5. An optical system having an optical transmission path and a plurality of spaced-apart optical amplifiers each operative for amplifying an optical signal received via the transmission path, the optical signal being formed from a plurality of optical signals of respective wavelengths, the optical system further comprising an optical node connected to the transmission path and containing an optical demultiplexer that demultiplexes the optical signal when it is received at the optical node into the plurality of optical signals of different wavelengths and couples the demultiplexed signals to respective output paths, in which individual ones of the demultiplexed signals include, as a result of power divergence caused by at least one of the optical amplifiers, components of other ones of the demultiplexed signals, and at least one transmission filter device having a group of inputs coupled to respective ones of the output paths such that the at least one transmission filter device passes the signals respectively demultiplexed to the respective one of the output paths and suppresses to a particular degree the levels of the included component signals.

6. The system of claim 5 wherein the demultiplexed signals include optical signals having wavelengths between 1548 nanometers and 1551 nanometers.

7. The system of claim 5 wherein the at least one transmission filter device is a thin film filter capable of filtering each of the demultiplexed signals coupled to the respective ones of the inputs.

8. An optical system for receiving a composite optical signal via an optical transmission path having a plurality of spaced-apart optical amplifiers disposed along the optical transmission path, the composite optical signal being formed from a plurality of optical signals of respective wavelengths, the optical system further comprising a demultiplexer for demultiplexing the composite signal into the plurality of optical signals after the composite signal has been received via the optical transmission path and for then coupling the demultiplexed optical signals to respective outputs, wherein at least one of the demultiplexed optical signals includes, as a result of power divergence caused by at least one of the optical amplifiers, components of individual ones of the other ones of the optical signals forming the composite signal, and at least one transmission filter operative for passing the at least one demultiplexed optical signal to an output terminal and for suppressing the levels of the component signals included with the at least one demultiplexed optical signal.

* * * * *